INVENTORS
KANSAKU KANEKO, TOSHIMASA FUJIWARA,
OSAMU SAKUTA, TAKAO MIYASAKA,
KENICHI KITAMURA

United States Patent Office 3,505,547
Patented Apr. 7, 1970

3,505,547
STATOR OF INDUCTION MOTOR
Kansaku Kaneko, Toshimasa Fujiwara, Osamu Samuta, Takao Miyasaka, and Kenichi Kitamura, Yokohama, Japan, assignors to Victor Company of Japan, Limited, Yokohama, Japan
Filed Jan. 3, 1967, Ser. No. 606,705
Claims priority, application Japan, Jan. 11, 1966, 41/1,529
Int. Cl. H02k 7/00, 17/00
U.S. Cl. 310—67         4 Claims

ABSTRACT OF THE DISCLOSURE

An improvement in a stator of an induction motor in which a magnetic cylindrical body having apertures is fitted with the peripheral surface of the iron core so that the magnetic cylindrical body is opposite to a rotor of the induction motor, and each groove for receiving the exciting coil and shading coil is made between each pole formed in a rod shape. By providing the magnetic cylindrical body, the distribution of the magnetic flux can be improved easily and by the construction of the grooves a stator of an induction motor suitable for easy assembly of the exciting coils and shading coils can be obtained.

---

This invention relates to a stator of an induction motor and more particularly to a construction of pole faces of a stator of an induction motor.

In a conventional four-pole motor of the outer rotor type having shading coils, the shading coils are fixed on a laminated iron core, and exciting coils are inserted into grooves on the iron core after being formed in a certain shape and insulated suitably, or exciting coils are wound directly in grooves on the iron core after an insulation treatment is applied to said grooves, thereafter each opening of said grooves is closed by each magnetic wedge made of magnetic materials such as iron etc., respectively. In such construction, however, each opening of the grooves on the laminated iron core is narrow, so that it is very difficult to insert said shading coil and exciting coil into the groove and it requires a long time for assembly thereof, further it requires a great deal of skill for such assembly.

This invention obviates such defects in the conventional motor as described above.

A principal object of this invention is to provide a stator of an induction motor, which is simple in construction and suitable for assembly and mass production thereof.

Another object of this invention is to provide a stator of an induction motor of which construction is suitable for easy assembly of the exciting coils and shading coils.

Further object of this invention is to provide a stator of an induction motor wherein the distribution of magnetic flux is preferable.

Still another object of this invention is to provide a stator of an induction motor of which starting characteristics do not oscillate due to a pulsation of torque.

Other objects and features of this invention will become apparent from the detailed description taken in conjunction with the accompanying drawing, in which.

Figure 1:
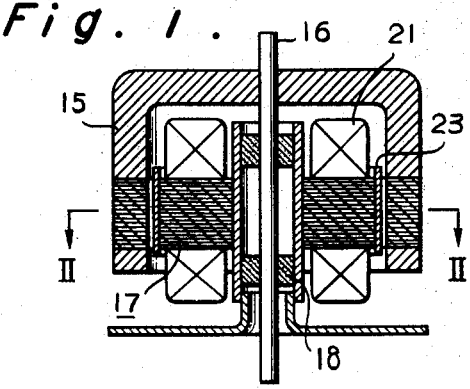
FIG. 1 is a longitudinal sectional side view of one embodiment of a motor of the outer rotor type according to this invention.

Referring now to the figures, 10 is a laminated iron core, 11 magnetic wedges, 12 shading coils, and 13 exciting coils. In said construction, the shading coils 12 are fixed on the laminated iron core 10, and the exciting coils 13 are inserted into grooves 14 on the iron core after being formed in a certain shape and insulated suitably, or exciting coils are wound directly in grooves 14 on the iron core after an insulation treatment is applied to said groove, thereafter each opening of said grooves 14 is closed by each magnetic wedge 11 made of magnetic materials such as iron etc., respectively. In such construction, however, each opening of the grooves 14 on the laminated iron core is narrow, so that it is very difficult to insert said shading coil and exciting coil into each groove 14 and it requires a long time for assembly thereof, further it requires a great deal of skill for such treatment.

FIGS. 1 to 5 show several embodiments of a motor of the outer rotor type according to this invention.

Figure 2:
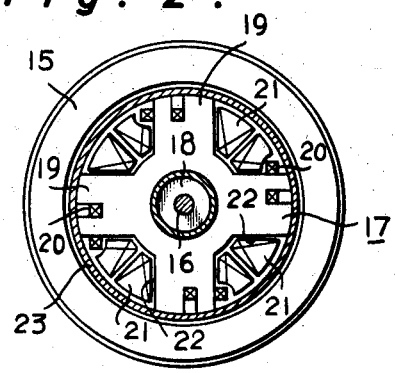
FIG. 2 is a plan view showing a section of the motor taken along a line II—II shown in FIG. 1.
Figure 3:
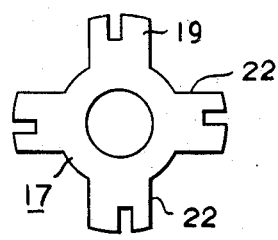
FIG. 3 is a plan view of one embodiment of a stator core of this invention.
Figure 6:
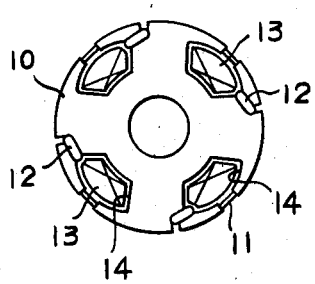
FIG. 6 is a plan view of a stator of a conventional four-pole motor of the outer rotor type having shading coils.

In FIGS. 1 and 2, an outer rotor 15 is fixed on a shaft 16 and supported so as to rotate freely by bearings 18 arranged in the center of a stator 17. The stator 17 has four poles 19 with shading coils 20. As shown in FIG. 3, the tip end of each pole 19 is not of T-shape as is the case for the prior art shown in FIG. 6, but of rod shape so that an exciting coil 21 formed in a certain shape can be easily inserted into each groove 22 between each pole. On the outer peripheral surfaces of the poles 19 a cylinder 23 made of magnetic materials is provided.

The motor as stated above is assembled by the steps of which the shading coils 20 formed in a certain shape are mounted on the laminated iron core 17 or bar shaped shading coil blanks are wound directly on the laminated iron core 17, and the exciting coils 21 formed in a certain shape and insulated suitably are inserted into grooves 22 or exciting coils 21 are wound directly in the grooves on the iron core 17 after an insulation treatment is applied to said grooves, therafter the magnetic cylindrical body 23 is fixed on the outer peripheral surface of the laminated iron core 17 by press fitting or adhering.

Figure 4:
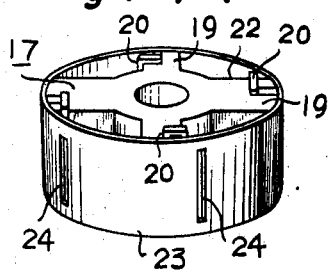
FIG. 4 is a perspective view of one embodiment of a stator according to this invention.
Figure 5:
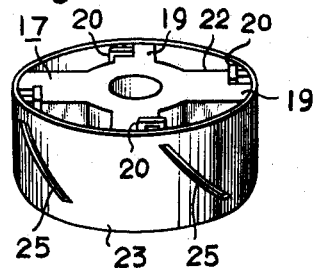
FIG. 5 is a perspective view of another embodiment of the stator according to this invention.

FIG. 4 shows one embodiment of the cylinder 23 fixed on the stator according to this invention. Elongated apertures 24 are provided on said cylinder 23 in the axial direction for discriminating the distributions of magnetic fluxes of the main poles and the shading poles, each of said apertures 24 being provided in a suitable portion between each said pole 19. Namely, said apertures 24 are provided at intervals of a predetermined distance from each other and the number of intervals is equal to or an integral number of the magnetic poles on the iron core. Instead of the apertures 24, if slits 25 are provided obliquely, as shown in FIG. 5, in the same was as the conductors of a rotor in a squirrel-cage induction motor are provided obliquely, the oscillation due to the pulsation of torque can be prevented without inclining the conductors of the rotor and the starting characteristics can be improved.

When it is constructed as described above, the exciting coils 21 and shading coils 20 can be assembled easily because the tips of the magnetic poles 19 are not of T-shape and the distribution of the magnetic flux can be improved by the effects of magnetic cylinder 23 provided on the tip ends of magnetic poles 19 without forming T-shaped tip ends on the magnetic poles. The number, position, and shape etc. of the apertures 24 or slits 25 provided on the magnetic cylinder 23 have to be experimentally determined because they exert influences upon the output, efficiency and oscillation etc. of the motor, for obtaining a motor having excellent characteristics.

Further, it is preferable to use a fixed means which can regulate the relative angle between the magnetic cylinder 23 and the magnetic poles 19 for adjusting the positions of the apertures 24 or slits 25 against the poles.

In this embodiment there is described the case where this invention is applied to the motor of the outer rotor type, however, this invention is not limited to the foregoing description and of course it may be applied to the motor of other types, for example, an inner rotor type.

What we claim is:

1. A stator of an induction motor comprising a laminated iron core having a plurality of radially extending rod-shaped magnetic poles; shading coils provided at the tip ends of said magnetic poles on said iron core; exciting coils mounted about said magnetic poles; and a magnetic cylindrical body opposite a rotor of the induction motor fitted with said tip ends of magnetic poles in said iron core and provided with a plurality of slots the number of which is an integral number multiple of the number of the magnetic poles, said slots extending obliquely to the axial direction of said iron core.

2. A stator of an induction motor of the outer rotor type comprising a laminated iron core including a center portion and a plurality of magnetic poles formed in rod shape and extended radially and outwardly from said center portion; shading coils provided at the tip ends of magnetic poles on said iron core; exciting coils mounted about said magnetic poles; and a magnetic cylindrical body opposite a rotor of the induction motor, fitted on said tip ends of the magnetic poles in said iron core and provided with a number of slots which is an integral number multiple of the number of the magnetic poles, said slots extending obliquely to the axial direction of said iron core.

3. A stator of an induction motor comprising a laminated iron core having a plurality of radially extending, rod-shaped magnetic poles; shading coils provided at the tip ends of said magnetic poles on said iron core; exciting coils mounted about said magnetic poles; and a magnetic cylindrical body opposite a rotor of the induction motor, fitted with said tip ends of magnetic poles in said iron core and provided with a plurality of slots the number of which is an integral number multiple of the number of the magnetic poles, said slots extending in parallel to the axial direction of said iron core.

4. A stator of an induction motor of the outer rotor type comprising a laminated iron core including a center portion and a plurality of magnetic poles formed in rod shape and extending radially and outwardly from said center portion; shading coils provided at the tip ends of magnetic poles on said iron core; exciting coils mounted about said magnetic poles; and a magnetic cylindrical body opposite a rotor of the induction motor, fitted on said tip ends of the magnetic poles in said iron core and provided with a number of slots which is an integral number multiple of the number of the magnetic poles, said slots extending in parallel to the axial direction of said iron core.

References Cited

UNITED STATES PATENTS

| | | | |
|---|---|---|---|
| 1,959,391 | 5/1934 | Spencer | 310—172 |
| 2,766,392 | 10/1956 | Wagner | 310—172 |
| 2,659,831 | 11/1953 | Lautner | 310—190 |
| 2,981,856 | 4/1961 | Ludemann et al. | 310—190 |

MILTON O. HIRSHFELD, Primary Examiner

L. A. ROUSE, Assistant Examiner

U.S. Cl. X.R.

310—86, 166